(12) United States Patent
Krysiak et al.

(10) Patent No.: US 7,412,878 B2
(45) Date of Patent: Aug. 19, 2008

(54) WATERING INDICATOR

(75) Inventors: Michael Dennis Krysiak, Green Bay, WI (US); Daniel Paul Madigan, Green Bay, WI (US)

(73) Assignee: Encap LLC., Green Bay, WI (US)

( * ) Notice: Subject to any disclaimer, the term of this patent is extended or adjusted under 35 U.S.C. 154(b) by 77 days.

(21) Appl. No.: 10/841,204

(22) Filed: May 6, 2004

(65) Prior Publication Data
US 2005/0247258 A1    Nov. 10, 2005

(51) Int. Cl.
*G01N 19/10*  (2006.01)
(52) U.S. Cl. .......................................... 73/76
(58) Field of Classification Search ...................... 73/76
See application file for complete search history.

(56) References Cited

U.S. PATENT DOCUMENTS

| | | | | |
|---|---|---|---|---|
| 4,540,427 A | * | 9/1985 | Helbling | 71/27 |
| 5,300,606 A | * | 4/1994 | Aizawa et al. | 526/307.6 |
| 5,927,003 A | * | 7/1999 | Miller et al. | 47/1.01 R |
| 2002/0095864 A1 | * | 7/2002 | Obert et al. | 47/57.6 |

* cited by examiner

*Primary Examiner*—Hezron E. Williams
*Assistant Examiner*—Paul M West
(74) *Attorney, Agent, or Firm*—Philip M. Weiss; Weiss & Weiss

(57) ABSTRACT

An Indicator that visually signals when it is time to start and stop watering by the Indicator's ability to distinctively change it's relative physical size and/or shape as it takes on and releases the water.

4 Claims, 2 Drawing Sheets

WATERING INDICATOR

FIELD OF THE INVENTION

A water-absorbing material (Indicator) used to visually signal when it is time to start and stop watering seeds, soil, and/or plant life by the Indicator's ability to distinctively increase/decrease in relative size as it absorbs/releases moisture, respectively. This distinctive change in relative size provides a visual when-to-water reference guide and/or signal. If the Indicator is of a relatively small size (i.e. Indicator is not activated), watering is needed. If the Indicator is of a distinctively larger size (i.e. Indicator is activated), watering is not necessary.

BACKGROUND OF THE INVENTION

Water-holding materials such as organic cross-linked polymers have been used for many years to absorb and hold moisture. They have been designed and used to improve the capability of soils and other growing media by retaining water and plant nutrients. By absorbing water, they provide a readily available source of water that is essential for proper plant growth. These polymers serve as a reservoir of water that is available for plants, seeds, and/or soil as needed. These polymers are typically used for mixing into growing media prior to seeding, sodding or small container planting. Also, they can be used for root dipping. These polymers are typically potassium or sodium based polymers. Claimed benefits pertaining to the additional moisture available include: less time spent watering, better irrigation control, increased shelf life of plants, better survival rates, provides aeration in soil, reduced transplant shock, and help reduce media volume, all of which relate to the benefits associated with the polymers ability to serve as a water reservoir (absorbing and releasing) for the plants, seeds, and/or soil direct use.

Germination begins when water is absorbed (imbibed) by the seed. As reported in Turfgrass: Science and Culture by James B. Beard (1973 by Prentice-Hall, Inc):

Environmental conditions necessary for rapid, complete germination of turfgrass seeds include (a) an adequate water supply, (b) favorable temperatures, (c) an adequate oxygen supply, and (d) exposure to light. Water has a vital role since water absorption by imbibition and osmosis is the first physiological step in seed germination. Water functions in softening and swelling of the seed, which facilitates the entrance of oxygen and dilutes the protoplasm. Normal digestion, respiration, and assimilation processes are activated when the protoplasm becomes sufficiently moist. Soluble carbohydrates are transferred from the endosperm to the embryo.

A number of practices can be employed during the establishment phase to ensure the rapid development of a dense, tight sod. Proper irrigation is a key factor in successful turfgrass establishment. One of the most critical practices during both the germination and establishment phases is irrigation. The soil zone where seed germination and seedling growth activity occur should be maintained in a moist condition at all times.

Failure to maintain an adequate moisture level is one of the major causes of poor turfgrass establishment. Young turfgrass seedlings have an extremely short root system that depends on a readily available moisture supply at the soil surface. The surface of un-mulched soils can dry out very rapidly during periods of high light intensity and high temperatures. The soil surface should be maintained in a moist condition for at least three weeks following planting.

When it comes to germination and establishment, plant available moisture is the limiting factor as it controls turfgrass growth and aesthetic appearance more than any other environmental factors.

Most people simply do not know when to start and stop watering newly planted seeds to assist in the germination and establishment process. Currently, gauges exist to measure amounts of rainfalls and timers exist to activate/deactivate irrigation systems at specified times. Further technology exists that automate the watering process at research facilities based on electronic indicators. None of these provide a simple visual indicator that is available to the general public to serve as a when-to-water guide.

SUMMARY OF THE INVENTION

The present invention relates to the use of water-absorbing/releasing materials (Indicators) to serve as the visual indicators for people to know when they are to start and stop watering their lawn. It is an object of the present invention for the Indicator to, when dry, to be of a small relative size when applied on and/or near seed and/or plant life. It is an object of the present invention for the applied Indicator to swell and increase in size to a distinctively larger relative size (serving as the Indicator) when the soil, seed, and/or plant life are watered to desired levels. It is an object of the present invention for the process to be repeatable and predictable.

It is an object of the present invention for the water absorbing material to comprise cross-linked polymers. It is an object of the present invention for the cross-linked polymer to be potassium or sodium based polymers.

It is an object of the present invention for the Indicator, in areas where the Indicator has been applied, to visually show which areas have received more water than others, as the Indicator will not be fully activated to the distinctively larger relative size in areas receiving less water.

The present invention relates to a method for determining when to start and stop watering seeds. An Indicator is applied on top of the seed and/or soil, the Indicator being of a relatively small size. Water is applied to moisten the seed and soil. The Indicator absorbs moisture and swells, making the Indicator readily visible and of a distinctively different and larger size. When the distinctively larger size Indicator is present, this signals the user to stop watering. Moisture is then released by the Indicator, soil and/or seeds as they dry. The need for additional watering is signaled when the Indicator is reduced to a distinctively smaller sized Indicator. It is an object of the present invention for this method to be repeatable. It is an object of the present invention for the Indicator to be applied along with the seed.

When planting seeds of any type, a person follows the seed planting directions provided with the seed. It is an object of the present invention for the Indicator to be applied in addition to the seed, soil, and/or plant life. This Indicator has the capacity to repeat this cycle, providing repetition as required for establishment. It is preferred that the Indicator be applied on the soil surface and not worked into the soil to maximize it's ability to be seen, although it could also be applied along with the seed if desired.

It is an object of the present invention for the Indicator to reduce the amount of over watering that occurs by individuals who do not know how much watering is necessary for seeds, soil, and/or plant life.

It is an object of the present invention for the indicator's change to be visually noticeable to the naked eye from a distance of approximately five feet or more.

DETAILED DESCRIPTION OF THE INVENTION

In an embodiment of the present invention cross-linked polymers are used as the Indicator. In an embodiment, these polymers are typically potassium or sodium based polymers. The Indicator is provided to serve as a visual signal on when to start and stop watering. The use of the Indicator relates to the frequency and length of watering required for seed establishment. The present invention does not relate to the water retention for the benefit of the soil and/or plant life.

Cross-linked polymer Indicators absorb water at varying rates, based on particle size and chemistry. Typically, the more surface area per granule of the polymer (i.e. the smaller the particle size, the larger the surface area), the more rapid water is taken on to increase the swelling rate. Testing has shown that these Indicators can swell to visible size in various, and desirable increments associated with seed moisture needs. Within a 20-30 minute period of watering with standard sprinkling heads, the Indicator can swell to form a pea size or larger granule that is visible from a five-foot distance. This watering amount generally results in a ½ inch of watering which is adequate for establishing favorable watering conditions for newly planted seeds. As the soil surface dries out, the Indicator releases the moisture until the Indicator is less visually noticeable. When this occurs, the soil surface has generally lost it's moisture for the seed, and it is time to water again. Based on the selected Indicator, this process repeats itself for various periods.

An added benefit of the present invention is that various sprinklers water at various rates. Even an individual sprinkler can water in a fashion that is not uniform. The present invention visually shows which areas have received more water than others, as the Indicator will not be present in areas receiving less water.

Figure 1:
FIG. 1 shows an unwatered lawn having the Indicators of the present invention.

FIG. 1 shows un-watered seeds, mulch, and Indicators on soil. The Indicators are not activated and are of a small relative size.

Figure 2:
FIG. 2 shows a watered lawn having the Indicators of the present invention.

FIG. 2 shows watered seeds, mulch, and Indicators on soil. The Indicators are activated and are of a large relative size. As shown by FIGS. 1 and 2, the Indicator sizes are distinctively and notably different in relative size.

The invention claimed is:

1. A method for determining when to stop watering a lawn comprising:
    planting seeds and/or plant life;
    applying an Indicator on surface of soil along with said seed and/or plant life;
    said Indicator being of a given size and/or shape;
    applying water to said seed and/or plant life;
    said Indicator absorbing moisture and changing to a distinctively different size and/or shape (i.e. swelling) that is visually noticeable;
    whereby, said change to Indicator serves as a visual signal to stop watering.

2. The method of claim 1, wherein said Indicator also signals when to start watering said seeds, soil, and/or plant life again;
    wherein said Indicator, as it releases water during the drying process (i.e. is deactivated), changes to a distinctively smaller size and/or different shape as said Indicator's said change, serving as the visual signal to start watering again.

3. The method of claim 2 wherein said method is repeated.

4. The method of claim 2 wherein said Indicator is applied along with said seed.

* * * * *